(12) United States Patent
Thiagarajan et al.

(10) Patent No.: US 10,784,586 B2
(45) Date of Patent: Sep. 22, 2020

(54) RADIO FREQUENCY ANTENNA INCORPORATING TRANSMITTER AND RECEIVER FEEDER WITH REDUCED OCCLUSION

(71) Applicant: MMRFIC Technology Pvt. Ltd., Bangalore (IN)

(72) Inventors: Ganesan Thiagarajan, Bengaluru (IN); Saravanakumar Ganeshan, Bengaluru (IN)

( * ) Notice: Subject to any disclaimer, the term of this patent is extended or adjusted under 35 U.S.C. 154(b) by 0 days.

(21) Appl. No.: 16/163,842

(22) Filed: Oct. 18, 2018

(65) Prior Publication Data

US 2019/0123450 A1 Apr. 25, 2019

(30) Foreign Application Priority Data

Oct. 22, 2017 (IN) .............................. 201741033774

(51) Int. Cl.
| | | |
|---|---|---|
| *H01Q 15/14* | (2006.01) | |
| *H01Q 19/19* | (2006.01) | |
| *G01S 13/02* | (2006.01) | |
| *H01Q 15/04* | (2006.01) | |
| *H01Q 19/02* | (2006.01) | |
| *H01Q 19/06* | (2006.01) | |
| *H01Q 1/52* | (2006.01) | |
| *H01Q 3/26* | (2006.01) | |
| *H01Q 21/06* | (2006.01) | |

(52) U.S. Cl.
CPC ............. *H01Q 19/19* (2013.01); *G01S 13/02* (2013.01); *H01Q 1/525* (2013.01); *H01Q 3/2658* (2013.01); *H01Q 15/04* (2013.01); *H01Q 15/14* (2013.01); *H01Q 19/021* (2013.01); *H01Q 19/062* (2013.01); *H01Q 21/064* (2013.01); *H01Q 21/065* (2013.01)

(58) Field of Classification Search
CPC ...... H01Q 15/14; H01Q 19/19; H01Q 19/062; H01Q 19/06; H01Q 21/064; H01Q 21/065; H01Q 3/2658
See application file for complete search history.

(56) References Cited

U.S. PATENT DOCUMENTS

| | | | | |
|---|---|---|---|---|
| 3,877,032 A | * | 4/1975 | Rosa ..................... | H01Q 3/2658 343/778 |
| 5,298,909 A | * | 3/1994 | Peters ..................... | G01S 13/86 342/53 |

(Continued)

*Primary Examiner* — Ab Salam Alkassim, Jr.

(57) ABSTRACT

An antenna system (201) comprising a set of transmitting elements (320A-K) and a set of receiving elements (310A-N) formed on a same or different planar surface (210), an electromagnetic lens (220) to focus electromagnetic rays transmitted from the set of transmitting elements (320A-K), a convex secondary antenna (240) operative to reflect the electromagnetic rays and a concave parabolic primary antenna (230) operative to transmit the electromagnetic rays in a first direction such that, the lens, the convex secondary antenna and the concave parabolic primary antenna together provide a transmitting gain in the first direction. The set of transmitting elements are disposed at central area of the planar surface and the set of receiving elements are disposed on the periphery of the central area such that the set of receiving elements occupy larger area on the planar surface compared to the set of transmitting elements.

5 Claims, 5 Drawing Sheets

(56) References Cited

U.S. PATENT DOCUMENTS

| | | | | |
|---|---|---|---|---|
| 5,327,149 A * | 7/1994 | Kuffer | G01S 13/86 | 342/53 |
| 5,706,017 A * | 1/1998 | Buttgenbach | H01Q 19/06 | 343/753 |
| 6,225,957 B1 * | 5/2001 | Yamaguchi | H01Q 15/23 | 343/755 |
| 6,252,559 B1 * | 6/2001 | Donn | H01Q 19/19 | 343/756 |
| 9,583,840 B1 * | 2/2017 | Lawrance | H01Q 19/062 | |
| 10,295,313 B2 * | 5/2019 | Podgorski | H01Q 13/02 | |
| 2003/0214451 A1 * | 11/2003 | Mizuno | H01Q 19/17 | 343/781 P |
| 2004/0252586 A1 * | 12/2004 | Martin | G01N 29/02 | 367/89 |
| 2005/0237265 A1 * | 10/2005 | Durham | H01Q 21/0093 | 343/909 |
| 2005/0280593 A1 * | 12/2005 | Cha | H01Q 1/34 | 343/757 |
| 2009/0219903 A1 * | 9/2009 | Alamouti | H01Q 1/007 | 370/338 |
| 2010/0052987 A1 * | 3/2010 | Weinstein | H01Q 19/19 | 342/372 |
| 2011/0215190 A1 * | 9/2011 | Pritchard | F41G 7/008 | 244/3.16 |
| 2012/0268333 A1 * | 10/2012 | Lucidarme | H01P 1/161 | 343/763 |
| 2013/0162475 A1 * | 6/2013 | Blech | H01Q 21/08 | 342/368 |
| 2014/0118220 A1 * | 5/2014 | Ley | H01Q 19/19 | 343/912 |
| 2014/0285373 A1 * | 9/2014 | Kuwahara | H01Q 19/062 | 342/27 |
| 2015/0207226 A1 * | 7/2015 | Podgorski | H01Q 19/062 | 342/368 |
| 2015/0280328 A1 * | 10/2015 | Sanford | H01Q 1/06 | 343/786 |
| 2016/0104943 A1 * | 4/2016 | Ley | H01Q 5/35 | 343/755 |
| 2017/0131399 A1 * | 5/2017 | Ioannidis | G01S 13/89 | |
| 2018/0058826 A1 * | 3/2018 | Podgorski | H01Q 13/02 | |
| 2018/0231651 A1 * | 8/2018 | Charvat | H01Q 1/3233 | |
| 2018/0287263 A1 * | 10/2018 | Hirabe | H01Q 21/20 | |

* cited by examiner

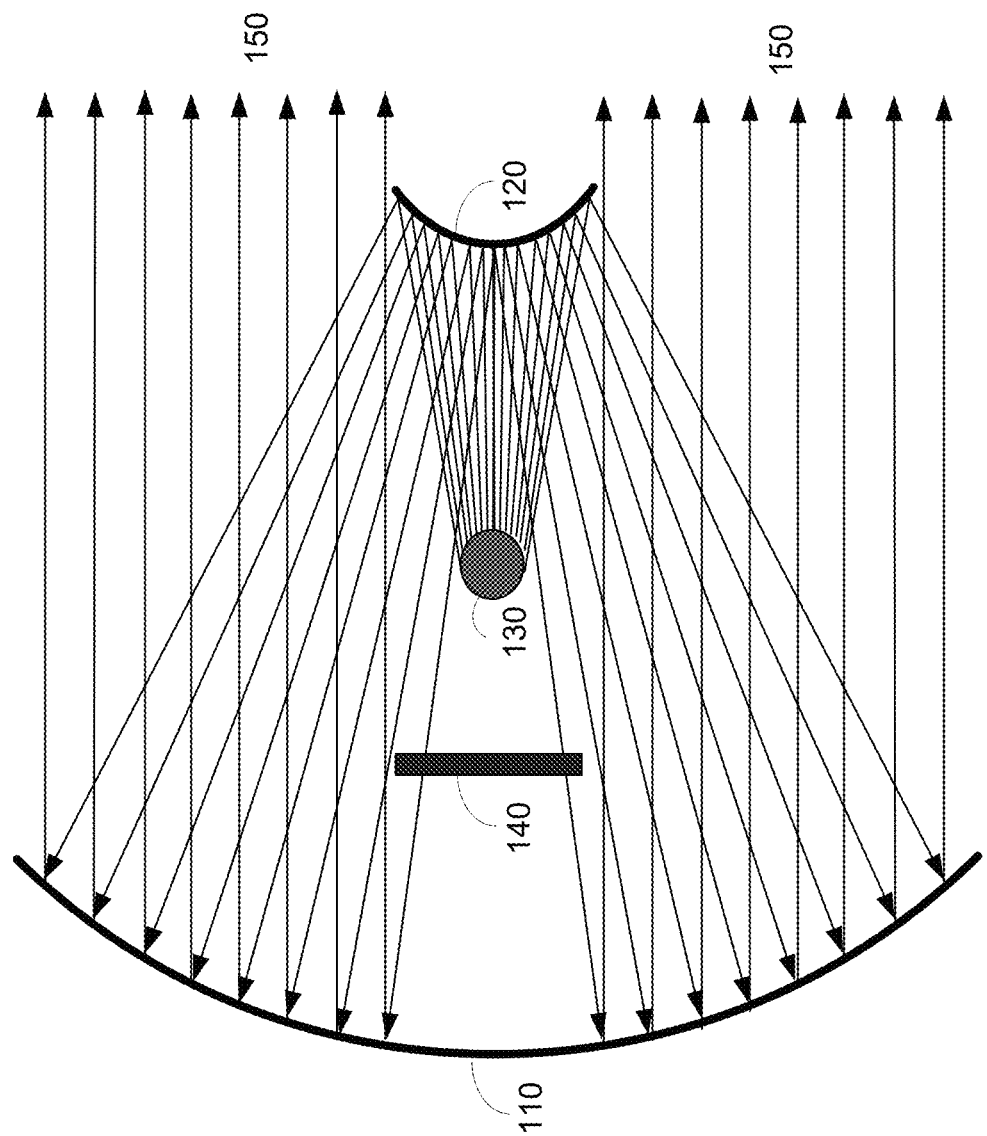
FIG. 1 [Prior Art]

RADIO FREQUENCY ANTENNA INCORPORATING TRANSMITTER AND RECEIVER FEEDER WITH REDUCED OCCLUSION

BACKGROUND

Cross References to Related Applications

This application claims priority from Indian patent application No. 201741033774 filed on Oct. 22, 2017 which is incorporated herein in its entirety by reference.

TECHNICAL FIELD

Embodiments of the present disclosure relate to radio frequency transmission system and more particularly relates to Radio Frequency (RF) antenna incorporating transmitter and receiver feeder with reduced occlusion.

RELATED ART

Wireless transceivers often employ RF antennas for radiating and collecting the RF signal for wireless communication. The antenna as a radiating element radiates the RF signal energy in all directions. Thus, the energy transmitted in any desired direction is lesser than the total energy/strength radiated by the antenna radiating element. In order to enhance the transmitted RF signal strength (gain) in a particular direction (often referred to as Beam forming), various techniques are employed. For example, one or more reflecting surfaces are provided to reflect the energy in the desired direction or to cause a beam as is well known in the art. Similarly, antenna as receiving element (converting electromagnetic waves to electrical signal) receives RF signal energy proportional to the area of the antenna. Accordingly, large concave/convex surfaces are employed to receive the RF signal and direct the received RF signal strength to an RF energy collection element, such as patch antenna, horn antenna, etc., as well known in the art. The one or more reflector surfaces employed in addition to the radiating and collecting antenna element are together referred to as antenna system or simply as antenna in some cases. The multi-reflector antenna system employs reflectors in various configurations such as concave-concave, concave-convex, Cassegrain etc., as well known in the art. In such multi-reflector antenna system, the radiating and collecting antenna elements are generally referred to as feeder. In the multi-reflector antenna system one of the multi-reflectors operate as primary while the other as secondary. FIG. 1 illustrates an example conventional Cassegrain antenna system. In that, the parabolic concave reflecting surface 110 is referred to as primary antenna and the convex reflecting surface 120 is referred to as secondary antenna. The feeder 130 radiates the RF signal, the secondary antenna 120 reflects the RF signal on to the primary antenna 110. The primary antenna reflects the RF signal in the desired direction 150. Similarly, RF signal received on the primary antenna 110 is reflected towards secondary antenna 120. The secondary antenna further focuses the received RF energy on to the collector 130. As may be seen, the feeder/radiating element 130 occlude the RF waves arriving from the secondary antenna 120 to collector 140. In general, in such conventional multi-reflector antenna system, positioning the radiator and collecting antenna element in relation with reflecting surfaces poses challenges as one (130) occlude the other (140) there by reducing the effective gain. Further the radiating element causes distortion or diffraction to the received signal and also exhibits lack of isolation between the radiating element and the receiving element.

SUMMARY

According to an aspect of the present disclosure, an antenna system comprising a set of transmitting elements and a set of receiving elements formed on a planar surface, an electromagnetic lens to focus electromagnetic rays transmitted from the set of transmitting elements, a convex secondary antenna operative to reflect the electromagnetic rays and a concave parabolic primary antenna operative to transmit the electromagnetic rays in a first direction such that, the lens, the convex secondary antenna and the concave parabolic primary antenna together provide a transmitting gain in the first direction. The set of transmitting elements are disposed at central area of the planar surface and the set of receiving elements are disposed on the periphery of the central area such that the set of receiving elements occupy larger area on the planar surface compared to the set of transmitting elements.

Several aspects are described below, with reference to diagrams. It should be understood that numerous specific details, relationships, and methods are set forth to provide full understanding of the present disclosure. Skilled personnel in the relevant art, however, will readily recognize that the present disclosure can be practiced without one or more of the specific details, or with other methods, etc. In other instances, well-known structures or operations are not shown in detail to avoid obscuring the features of the present disclosure.

BRIEF DESCRIPTION OF DRAWINGS

FIG. 1 illustrates an example conventional Cassegrain antenna system.

DETAILED DESCRIPTION OF THE PREFERRED EXAMPLES

Figure 2:
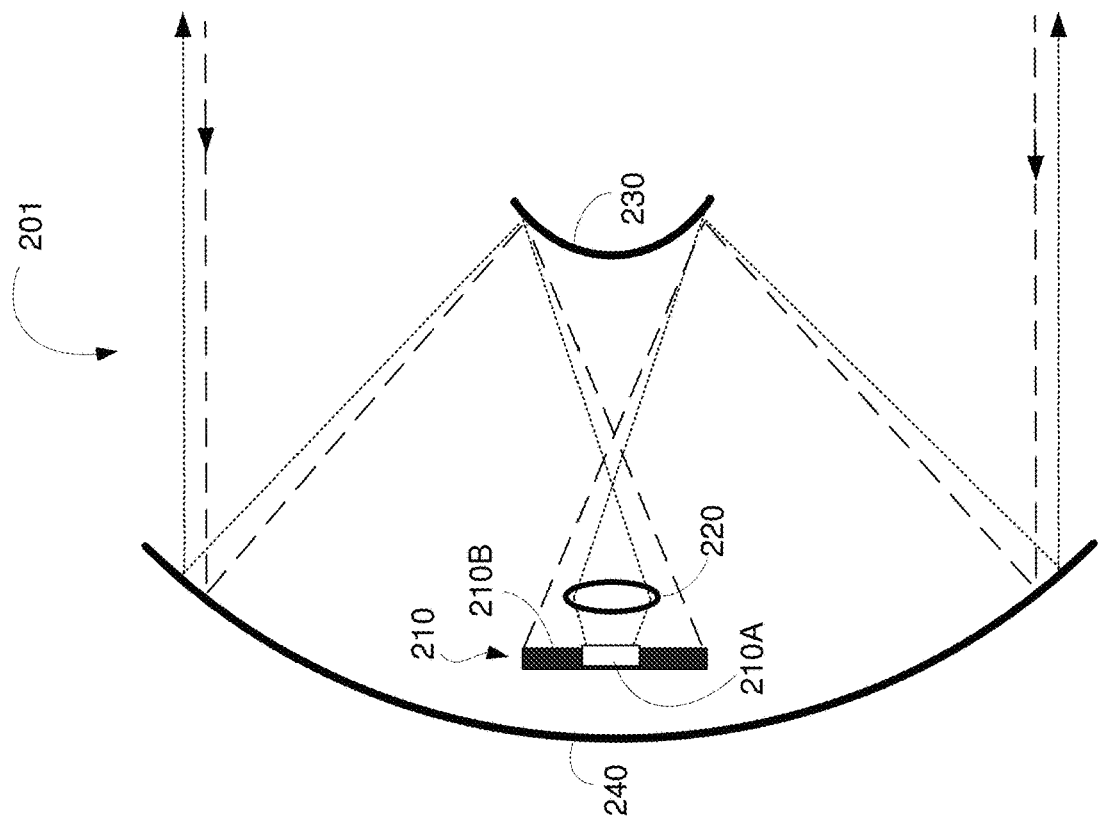
FIG. 2 is an example antenna system in one embodiment.

FIG. 2 is an example antenna system in one embodiment. The antenna system 201 is shown comprising antenna panel 210, lens 220, secondary antenna 230, and primary antenna 240. In that, the antenna panel 210 comprises both radiating antenna elements 210A and the collecting antenna element 210B (transmitter and receiver). The radiating antenna element 210A may comprise any of microwave guide, patch antenna, a conducting/radiating element of quarter or half the wavelength and/or any other radiating and collecting antenna structure employed in short distance radar, long distance radar, satellite communications, etc. In one embodiment, the transmitter (radiating) antenna element 210A is positioned at the centre of the panel while the receiving antenna element 210B is positioned off the centre, such as on the periphery of the panel. Further, both transmitter element 210A and the receiver elements 210B are on the same plane or different planes which are very close to each other.

The lens 220 focuses the transmitted RF beam (from the radiating antenna) on to the secondary reflector antenna 230. In one embodiment, the lens 220 is an electromagnetic lens (here onwards referred to as lens) that changes the path of the electromagnetic rays emerging from the antenna panel 210. The focal length and degree of convergence may be set dynamically using any known technique. In one embodiment, the aperture of the lens 220 adjusted such that the converging rays fall on the entire area of the secondary antenna 230.

Further, the lens 220 is positioned close to the transmitting element such that, it collects all the radiated rays. Further, the area of the lens 220 may be selected substantially equal to the area of the radiating element of the antenna. The lens 220 may direct the RF waves on to the secondary reflecting surface 230.

The secondary antenna 230 (secondary reflecting surface) reflects the RF wave received through lens 220 on to the primary antenna 240 (primary reflecting surface). In one embodiment the secondary antenna 230 is convex reflecting surface. The primary antenna 240 provides the final radiation of RF signal in the desired direction. The primary antenna 240 may be a spherically concave, paraboloid, for example. The primary antenna 240 may be directed or fixed to reflect the waves in the desired direction forming parallel rays.

In the similar fashion, the primary antenna 240 receives the RF waves from the space and reflects the received RF wave on to the secondary antenna 230. The secondary antenna 230 focuses the received RF wave towards the focal point and/or on to the antenna panel 210. The collecting element 210B on the antenna panel 210 collects the RF signal and coverts to corresponding electrical signal. Since both transmitter elements and receiver elements are on the same plane or different planes which are very close to each other, they do not occlude each other. Further, the lens 220 positioned close to the transmit element, refracts/diverts substantial energy transmitted from the transmit element on to the secondary antenna. Thus, lens 220 further enhances the gain of the antenna system 201. Further, the transmitting rays pass through lens 220, secondary antenna 230 and primary antenna 240. On the other hand, the receiving RF rays pass through only primary antenna and secondary antenna.

Figure 3:
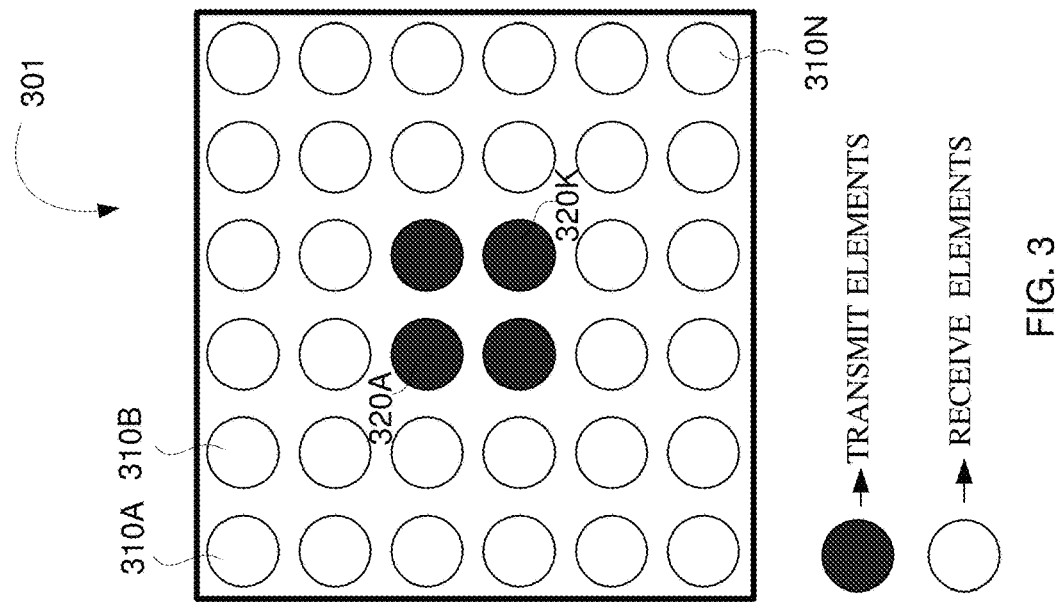
FIG. 3 is an example antenna panel in one embodiment.

FIG. 3 is an example antenna panel in one embodiment. The antenna panel 301 is shown comprising transmit elements 320A-K and receiving elements 310A-N. The transmit elements 320A-K are array of antenna elements clustered at the centre of the panel 301. In one embodiment, the lens 220 of a diameter enough to substantially cover the area of the transmitter element 320A-K may be deployed.

The receiving elements 310A-N are the array of antenna elements dispersed or arranged in symmetrical fashion around the transmit antenna 320A-K. In one embodiment, the receiving elements 310A-N are dispersed over an area that is substantially larger (say over and above 70%) than the area occupied by the transmit elements 320A-K (say below 30%). Thus, the RF waves reflected from the secondary antenna 230 are largely received by the collecting elements that occupy larger area in the panel 301 compared to the transmit antenna element. As may be appreciated, antenna system 201, allows, transmit energy to be directed to the desired direction with large antenna gain, while the RF signal received from the space is reflected on to the receiver for higher receiver gain. The antenna 201 may be employed in radar systems like Frequency Modulated Carrier Wave Radar (FMCW), Pulsed Radar, Multiple Input and Multiple Output (MIMO) Radar systems for example. The antenna 201 may be employed in RF imaging systems, CT/MRI Ultrasound scanning systems, and other surveillance systems like airport security scanner. The manner in which the antenna 201 may be deployed is described in further detail below.

Figure 4:
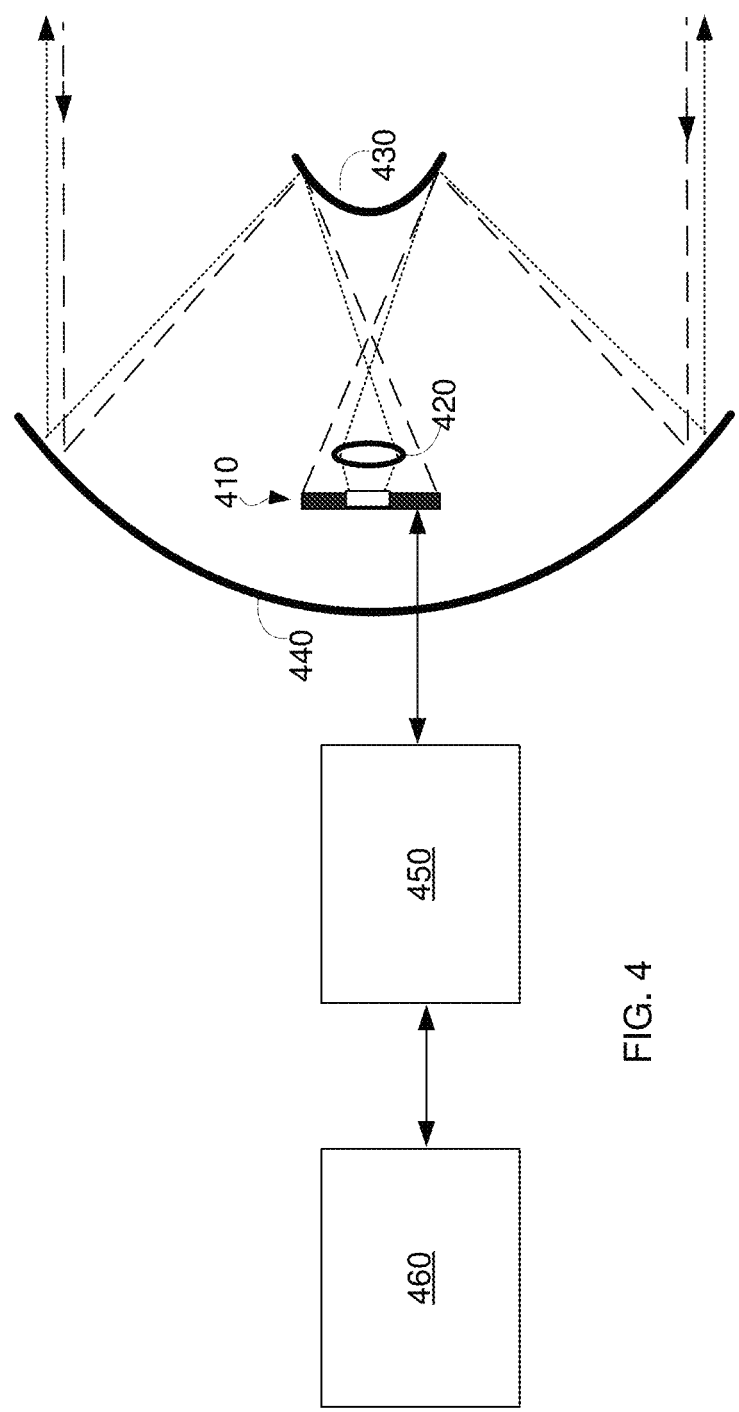
FIG. 4 is an example MIMO radar system in an embodiment.

FIG. 4 is an example MIMO radar system in an embodiment. The MIMO radar system is shown comprising antenna array 410, lens 420, secondary antenna 430, primary antenna 440, beamformer 450 and object detector 460. Each element is further described below.

The beamformer 450 and the object detector 460 together operate to detect object(s) position, shape, and range, in two or three dimensions using known radar techniques. For example, the beamformer 450 generates number of phase shifted radar signals to transmit over the transmit array so that the radiated RF signal form a beam in a desired direction. The direction is altered by adjusting the relative phase between the signals as is well known in the art. The transmitted RF signal is reflected back from the objects. The beamformer 450 forms number of beams from the reflected signal received on the receiving array elements. The beam so formed is provided to the object detector 460. The object detector 460 detects one or more objects, shape size, and range from the received beams and the corresponding transmitted radar signal.

The antenna array 410 comprises transmitting elements array and receiving elements array. In that, the transmitter element array and receiving element array are arranged such that area occupied by the transmit array and the area occupied by the receiving array are non-overlapping. For example, the transmitting array may be deployed at the centre of a panel, while the receiving elements may be arranged on the periphery as in panel 301 for example. Further the transmitter elements and receiver elements may be arranged adjacent to each other. In one embodiment, the area of the transmitter array in the antenna array 410 is 20% of the area of the receiving array. The antenna array 410 is formed on the same plane/substrate. The transmit array element causes a beam of RF signal perpendicular to the plane of the array. The beam shape and width are adjusted by the number of transmit array and the positions.

Conventionally, the gain of the antenna is achieved by increasing the number of transmit antenna elements. Such conventional techniques require larger area for placing the antenna elements and corresponding electronic circuitry associated with it.

Accordingly, in the embodiment the lens 420, secondary antennas 430 and primary antenna 440 together operate as antenna system 201 to overcome at least some of the disadvantages of the conventional antenna. As shown antenna array 410 the lens 420, secondary antennas 430 and primary antenna 440 together operate to transmit and receive radar signal. In that the lens 420, secondary antennas 430 and primary antenna 440 respectively perform operations similar to the lens 220, secondary antenna 230, and primary antenna 240. Due to use of the lens 420, secondary antennas 430 and primary antenna 440, a fewer number of antenna elements and the lesser power may suffice to provide the desired beam width and the range. The manner in which direction of the beam may be changed as the beamformer adjusts the relative phase angle is further described below.

Figure 5A:
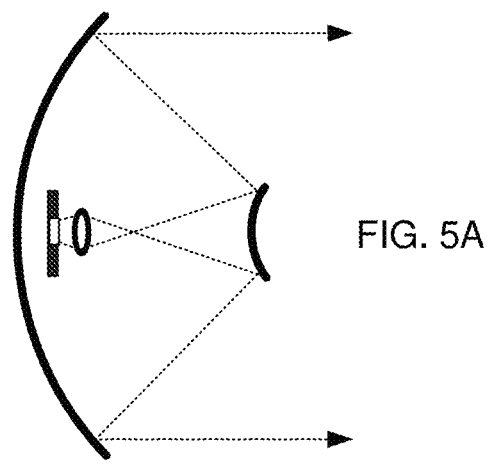
FIG. 5A through 5C illustrates the beam angle variation in one embodiment.
Figure 5B:
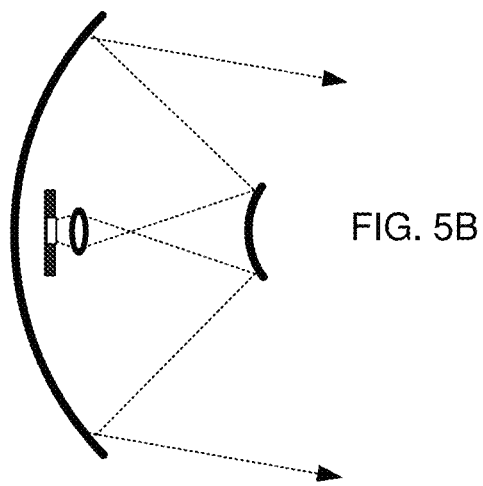
Figure 5C:
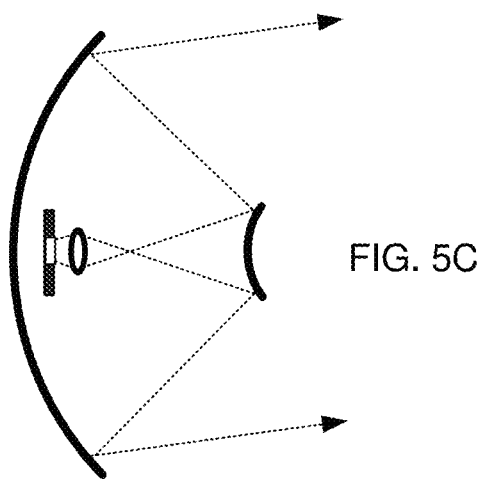

FIG. 5A through 5C illustrates the beam angle variation in one embodiment. In that, the FIG. 5A illustrates the condition when the beamformer 450 sets the phase angle of the entire signal to the transmit elements same. Thus, the beam is normal to the array panel 410. FIG. 5B illustrates the condition when the beamformer 450 sets the relative phase angle (delay) of each signal provided to the transmit elements to maxima of a desired dynamic range. The beam is shown making a +ve angle with normal to the panel 410. Similarly, FIG. 5C illustrates the condition when the beamformer 450 sets the relative phase angle (delay) to negative of the maxima of a desired dynamic range, if the angle spanned is equal in the positive and negative direction. If the angle covered in positive and negative directions are different, then the negative of the phase needed for the specific angle in the positive direction is used when the minimum angle in the negative direction is smaller than that in the positive direction. The beam is shown making a −ve angle with normal to the panel 410. Thus, primary antenna, secondary antenna, and lens remain neutral to the beamforming by the phase angle variation. In one embodiment, size of the primary antenna and the secondary antenna may be selected based on the beam steering range determined at the beamformer 450. Due to use of the lens 420, secondary antennas 430 and primary antenna 440, the desired beam width may be achieved with lesser number of antenna elements.

Figure 6:
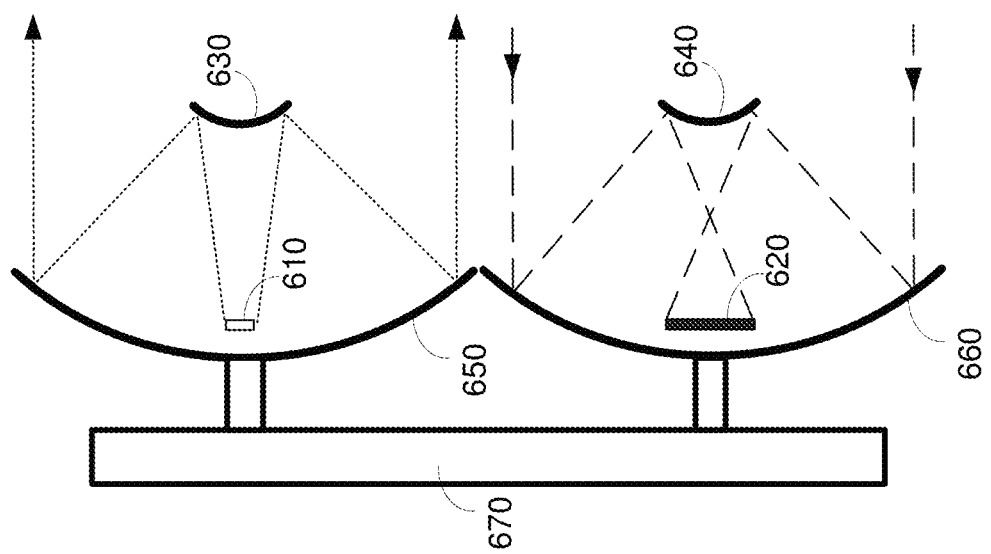
FIG. 6 illustrates antenna system in an alternative embodiment

FIG. 6 illustrates antenna system in an alternative embodiment. The antenna system 601 is shown comprising transmit element 610, receiving element 620, first primary antenna 650, second primary antenna 660, first secondary antenna 630 and second secondary antenna 640 and mounting brackets 670. In that, transmit element 610, first secondary antenna 630 and first primary antenna 650 operate to transmit the signal, while the receiving element 620, second secondary antenna 640 and second primary antenna 660 operate to receive the signal. Since both first primary and second primary antennas are coupled to same mounting bracket 670, they transmit and receive the signal to and from the same direction. Due to separation of the transmit element and receive element, the antenna system 601 provides as improved signal isolation between the transmitter and receiver. The transmit element 610 and receive element 620 may be coupled to the beamformer 450 when high degree of isolation is needed between the transmitter and receiver.

While various embodiments of the present disclosure have been described above, it should be understood that they have been presented by way of example only, and not limitation. Thus, the breadth and scope of the present disclosure should not be limited by any of the above-discussed embodiments but should be defined only in accordance with the following claims and their equivalents.

What is claimed is:

1. An antenna system comprising:
   a set of transmitting elements and a set of receiving elements formed on a planar surface with a first area, wherein set of transmitting elements are disposed at central area of the planar surface and the set of receiving elements are disposed on the periphery of the central area such that the set of receiving elements occupy larger area on the planar surface compared to the set of transmitting elements;
   an electromagnetic lens to focus electromagnetic rays transmitted from the set of transmitting elements;
   a convex secondary antenna operative to reflect the electromagnetic rays; and
   a concave parabolic primary antenna operative to transmit the electromagnetic rays in a first direction such that, the lens, the convex secondary antenna and the concave parabolic primary antenna together provide a transmitting gain in the first direction, and the concave parabolic primary antenna and the convex secondary antenna together providing a receiver gain on the set of receiving elements;
   wherein the occlusion of the transmitting elements is reduced by use of the electromagnetic lens and the occlusion of the receiving elements is reduced by disposing the set of receiving elements on the periphery;
   the electromagnetic lens is positioned so only the electromagnetic rays from the transmitting elements pass through the electromagnetic lens.

2. The antenna system of claim 1, wherein the electromagnetic lens is placed close to the central area and the focal length is adjusted to focus electromagnetic rays transmitted from the set of transmitting elements on the overall area of the convex secondary antenna.

3. The antenna system of claim 2, wherein the set of transmitting elements and set of receiving elements form a multiple input multiple output (MIMO) antennas.

4. The antenna system of claim 3, wherein the MIMO antennas transmitting a plurality of phase shifted radar signals to detect an object.

5. The antenna system of claim 4, wherein a beam with a second gain is formed from the electromagnetic wave transmitted from the parabolic primary antenna and the direction of the beam is in the first direction when a phase angle between plurality of the phase shifted radar signal is same, the direction of the beam makes a positive angle with the first direction when the phase angle between plurality of the phase shifted radar signal is not same, in that, the second gain is due to the combination of transmitting gain and the phase angle between plurality of the phase shifted radar signal.

* * * * *